(12) United States Patent
Xue et al.

(10) Patent No.: US 11,989,656 B2
(45) Date of Patent: May 21, 2024

(54) SEARCH SPACE EXPLORATION FOR DEEP LEARNING

(71) Applicant: International Business Machines Corporation, Armonk, NY (US)

(72) Inventors: Chao Xue, Beijing (CN); Yonggang Hu, Markham (CA); Lin Dong, Beijing (CN); Ke Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/935,445

(22) Filed: Jul. 22, 2020

(65) Prior Publication Data
US 2022/0027739 A1    Jan. 27, 2022

(51) Int. Cl.
*G06N 3/086*    (2023.01)
*G06N 3/045*    (2023.01)

(52) U.S. Cl.
CPC ............. *G06N 3/086* (2013.01); *G06N 3/045* (2023.01)

(58) Field of Classification Search
CPC .............................. G06N 3/086; G06N 3/0454
USPC ............................................................ 706/13
See application file for complete search history.

(56) References Cited

U.S. PATENT DOCUMENTS

| | | | |
|---|---|---|---|
| 8,838,510 B2 | 9/2014 | Baughman et al. | |
| 9,542,454 B2 * | 1/2017 | Lee | G06F 16/5838 |
| 11,250,327 B2 * | 2/2022 | Liang | G06N 3/04 |
| 2019/0080240 A1 * | 3/2019 | Andoni | G06N 3/084 |
| 2019/0370659 A1 * | 12/2019 | Dean | G06N 3/082 |

OTHER PUBLICATIONS

Elsken et al., "Neural Architecture Search: A Survey", Journal of Machine Learning Research 20 (2019) 1-21 (Year: 2019).*
Miller et al., "Designing Neural Networks using Genetic Algorithms", 3rd International Conference on Genetic Algorithms (ICGA'89), 1989 (Year: 1989).*
Corne et al., "Evolutionary Algorithms", Handbook of Heuristics, Springer 2018, pp. 1-19.
Liu et al. "Hierarchical Representations for Efficient Architecture Search", ICLR 2018, pp. 1-13.
Rodriguez, Jesus "Using Neural Networks to Design Neural Networks: The Definitive Guide to Understand Neural Architecture Search", KNIME, Oct. 2019, pp. 1-7.

* cited by examiner

*Primary Examiner* — Tsu-Chang Lee
(74) *Attorney, Agent, or Firm* — CANTOR COLBURN LLP; Jared Chaney

(57) ABSTRACT

Aspects of the invention include systems and methods to obtain meta features of a dataset for training in a deep learning application. A method includes selecting an initial search space that defines a type of deep learning architecture representation that specifies hyperparameters for two or more neural network architectures. The method also includes applying a search strategy to the initial search space. One of the two or more neural network architectures are selected based on a result of an evaluation according to the search strategy. A new search space is generated with new hyperparameters using an evolutionary algorithm and a mutation type that defines one or more changes in the hyperparameters specified by the initial search space, and, based on the mutation type, the new hyperparameters are applied to the one of the two or more neural networks or the search strategy is applied to the new search space.

20 Claims, 3 Drawing Sheets

SEARCH SPACE EXPLORATION FOR DEEP LEARNING

BACKGROUND

The present invention generally relates to programmable computers and, more specifically, to programmable computer systems configured and arranged to perform search space exploration for deep learning in machine learning algorithms.

Deep learning is a type of machine learning that involves a network of algorithms organized as multi-layered neural networks. Deep learning networks perform feature extraction as well as classification while other machine learning systems require manual feature extraction. Automatic machine learning (AutoML) is used to describe a type of software-based search and analysis tool that searches and allows selection among a set of available deep learning architectures and hyper-parameters. Hyperparameters are variables that determine network structure and variables that determine how the network is trained. By using AutoML to select a neural network and hyperparameters, less experienced programmers can train a neural network for a specific application.

SUMMARY

Embodiments of the present invention are directed to search space exploration for deep learning. A non-limiting example computer-implemented method includes obtaining meta features corresponding with a dataset configured to be used for training in a deep learning application, and selecting an initial search space. The initial search space defines a type of deep learning architecture representation to represent two or more neural network architectures and specifies hyperparameters for the two or more neural network architectures. The method also includes applying a search strategy to the initial search space that performs an evaluation of each of the two or more neural network architectures represented according to the initial search space, and selecting one of the two or more neural network architectures based on a result of the evaluation according to the search strategy. The method further includes generating a new search space with new hyperparameters that differ from the hyperparameters specified by the initial search space using an evolutionary algorithm and a mutation type that defines one or more changes in the hyperparameters specified by the initial search space. Based on the mutation type, the new hyperparameters are applied to the one of the two or more neural networks or the search strategy is applied to the new search space.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
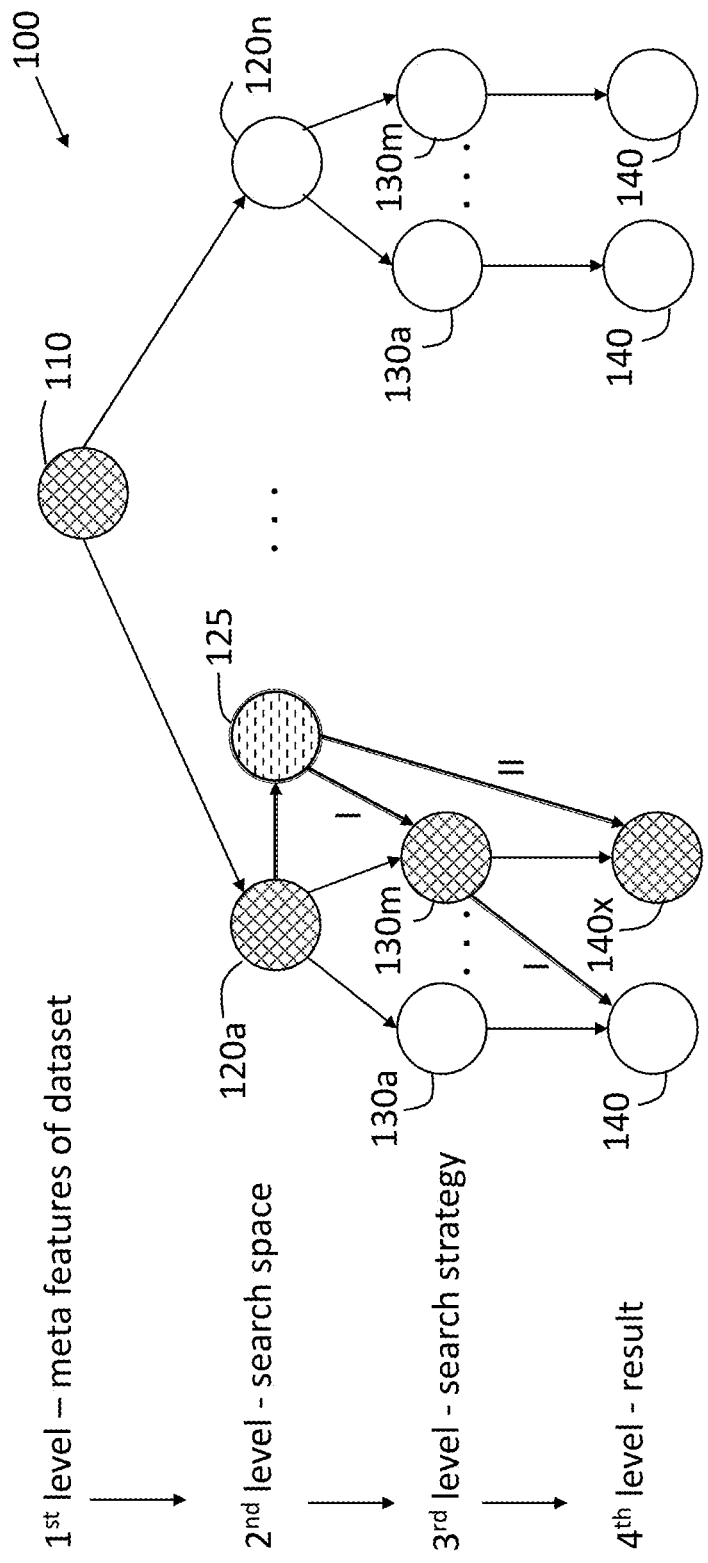
FIG. 1 illustrates decision tree-implemented search space exploration for selection of a deep learning architecture according to one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, a deep learning network performs feature extraction and classification using multi-layered neural networks. AutoML tools facilitate selection from among available deep learning architectures (i.e., neural network models) and hyperparameters for a given application of interest (e.g., image classification, language modelling). Embodiments of the invention provide systems and methods configured and arranged to perform search space exploration for deep learning. A search space refers to a type of representation of different neural network architectures (i.e., an architecture representation) and an associated set of hyperparameters. Exemplary, non-limiting types of representations of neural network architectures include graph representation and linear chain representation.

A given type of architecture representation can represent multiple neural network architectures that are characterized by the associated hyperparameters of the search space. While initial values of parameters are updated by the neural network model based on the training process, hyperparameters are set prior to the training process and remain unchanged by the neural network model. Exemplary hyperparameters specify the number of hidden layers of a neural network model, learning rate and momentum, which both relate to the backpropagation phase of training, and epochs, which indicates the number of times the neural network should train the entire dataset.

In prior AutoML approaches, the search strategy that is employed (e.g., efficient neural architecture search (ENAS), differentiable architecture search (DARTS)) is deemed the primary factor in selecting the most accurate neural network architecture for a given training dataset. Exemplary training datasets include CIFAR-10, which is a dataset of color images, the street and house number (SVHN) dataset, and FLOWER102, which is a dataset that includes 102 flower categories. Thus, according to the prior approach, for a given training dataset (e.g., dataset related to the application of interest), the accuracy in training that is achieved using different search strategies could be examined in order to select one of the search strategies. The selected search strategy then determines the best neural network architecture for use in the application of interest.

Based on a realization that, for a given search strategy and training dataset, the search space plays a key role in affecting accuracy, the one or more embodiments of the invention detailed herein were developed. According to the exemplary embodiments of the invention, in addition to using existing search spaces, new search spaces are created (additional combinations of architecture representation type and hyperparameters). Search space exploration is implemented via a decision tree. The efficiencies involved in the generation and examination of these newly created search spaces are detailed.

FIG. 1 illustrates decision tree-implemented search space exploration for selection of a deep learning architecture according to one or more embodiments of the invention. The arrangement of the decision tree 100 is from a first level to a fourth level or, put another way, from a root to the leaves. Generally, more information is gained closer to the root than a leaf. Thus, the search space exploration is arranged as a second level in decision tree 100. The selections along the decision tree 100 are indicated by a crosshatch pattern for clarity in FIG. 1. The selections may be based on historical data resulting from supervised learning. At the first level, meta features 110 refer to a vector generated from a particular dataset. The generation of the meta features 110 from a given dataset is known and not detailed here. While the levels of the decision tree 100 are defined as shown and discussed, the number of branches (i.e., the number of possibilities at each level) shown in FIG. 1 is only one example used for explanatory purposes.

At the second level of the decision tree 100, an initial search space 120a is selected for exploration, as indicated by the crosshatch. As indicated, any number of initial search spaces 120a through 120n (generally referred to as 120) may be available in the decision tree 100. As previously noted, historical data resulting from supervised learning may be used to select initial search space 120a. That is, initial search space 120a may be indicated by data resulting from supervised learning as the optimal initial search space 120 for the particular meta features 110. The initial search space 120a defines a particular type of architecture representation and associated hyperparameters. For example, the initial search space 120a may be a graph representation with hyperparameters that define the number of nodes in the graph representation along with many other characteristics.

At the third level of the decision tree 100, a selection among search strategies 130a through 130m (generally referred to as 130) is made for use with the initial search space 120a selected at the second level of the decision tree 100. In the exemplary case shown in FIG. 1, search strategy 130m is selected. This may be a reinforcement learning-based search strategy, random search, DARTS, or ENAS, for example. The selected search strategy 130m is applied to the architecture representation and set of hyperparameters defined by the selected initial search space 120a. That is, the search strategy 130m is used to compare the accuracy of results obtained with every neural network architecture 140 that is represented by the type of architecture representation of the initial search space 120a and characterized by the hyperparameters of the initial search space 120a. At the fourth level of the decision tree 100, a neural network architecture 140x is selected based on the selected search strategy 130m. The selected neural network architecture 140x is the result of the decision tree 100 and is based on the comparison of the accuracy of the results obtained with each neural network architecture 140.

According to one or more embodiments of the invention, a new search space 125 is generated from the initial search space 120a, as shown. The new search space 125 is generated using an evolutionary algorithm. A different pattern and distinct arrows are used to distinguish this new search space 125 in FIG. 1. The mechanism of the evolutionary algorithm is known and not detailed herein. Generally, the selected initial search space 120a of the decision tree 100 is used as the initial population or parent. Then the new search space 125 is created through mutation operations as an offspring of the initial search space 120a. Five specific mutation types are discussed herein. The particular mutation type used in a given evolution step of the evolutionary algorithm is selected randomly. The number of evolution steps in the evolutionary algorithm may be as low as one and may be on the order of 100. Thus, based on the number of evolution steps, each of the five mutation types may be selected at random during the course of implementation of the evolutionary algorithm.

The mutation operations are performed by changing hyperparameters and are generally in a first category (I) or a second category (II). Mutation operations in the first category (I) require re-selection of a neural network architecture 140 by reusing the selected search strategy 130m. This is indicated by the arrow from the new search space 125 to the search strategy 130m labelled "I" in FIG. 1. In this case, as indicated by the arrow labeled "I" from the search strategy 130m to the neural network architecture 140, it is possible that a different neural network architecture 140 is selected at the fourth level. Mutation operations in the second category (II) can be used directly on the neural network architecture 140x selected with the initial search space 120a. This is indicated by the arrow labelled "II" in FIG. 1. As discussed with reference to FIG. 2, the final neural network architecture 140 that is selected as a result of the evolutionary algorithm is used with the hyperparameters of the final new search space 125 resulting from the evolutionary algorithm.

An exemplary mutation operation in the first category (I) is altering the operations set by the initial search space 120a. The operations define a deep neural network topology. As shown in Table 1, separable convolution, max pooling, average pooling, skip connections, and dilated convolutions may be changed. Each of these is a known hyperparameter as are the mutation operations in the second category (II). Because the operations relate to the topology of the neural network, a change according to this first category (I) mutation requires reselecting a neural network architecture 140 using the existing search strategy 130m.

Four exemplary mutation operations in the second category (II) are described. Altering layer or cell number constraints refers to changing the number of layers (i.e., depth) of the deep neural network. When a cell-based representation is being used for the neural network architecture 140, the number of layers depends on the number of cells. Exemplary potential values are shown in Table 1. Altering a basic channel number constraint refers to changing the minimal number of channels (i.e., width) of the convolution operation. This value may generally be 16, for example, with other potential values shown in Table 1. Altering the skip pattern refers to changing the connection between operations in a chain when using a chain-structure representation of neural network architecture 140. Table 1 indicates examples of the available skip patterns. Altering the constraint of the input degree refers to changing the number of input connections to a node in a cell structure representation of a neural network architecture 140. The number of input connections may generally be 2, for example, with other potential values shown in Table 1.

TABLE 1

Exemplary optional values for the different mutation types.

| Mutation Type | Exemplary options |
|---|---|
| operations | {separable convolution 1 × 1/3 × 3/5 × 5/7 × 7, average pooling 3 × 3/5 × 5, max pooling 3 × 3/5 × 5, skip connect, dilated convolution 1 × 1/3 × 3/5 × 5/7 × 7} |
| scale of depth (layer number) | {8, 14, 20} |
| scale of width (channel number) | {16, 24, 36, 40} |
| skip pattern | {0, 1} |
| input degree constraint | {1, 2, 3, 4} |

Figure 2:
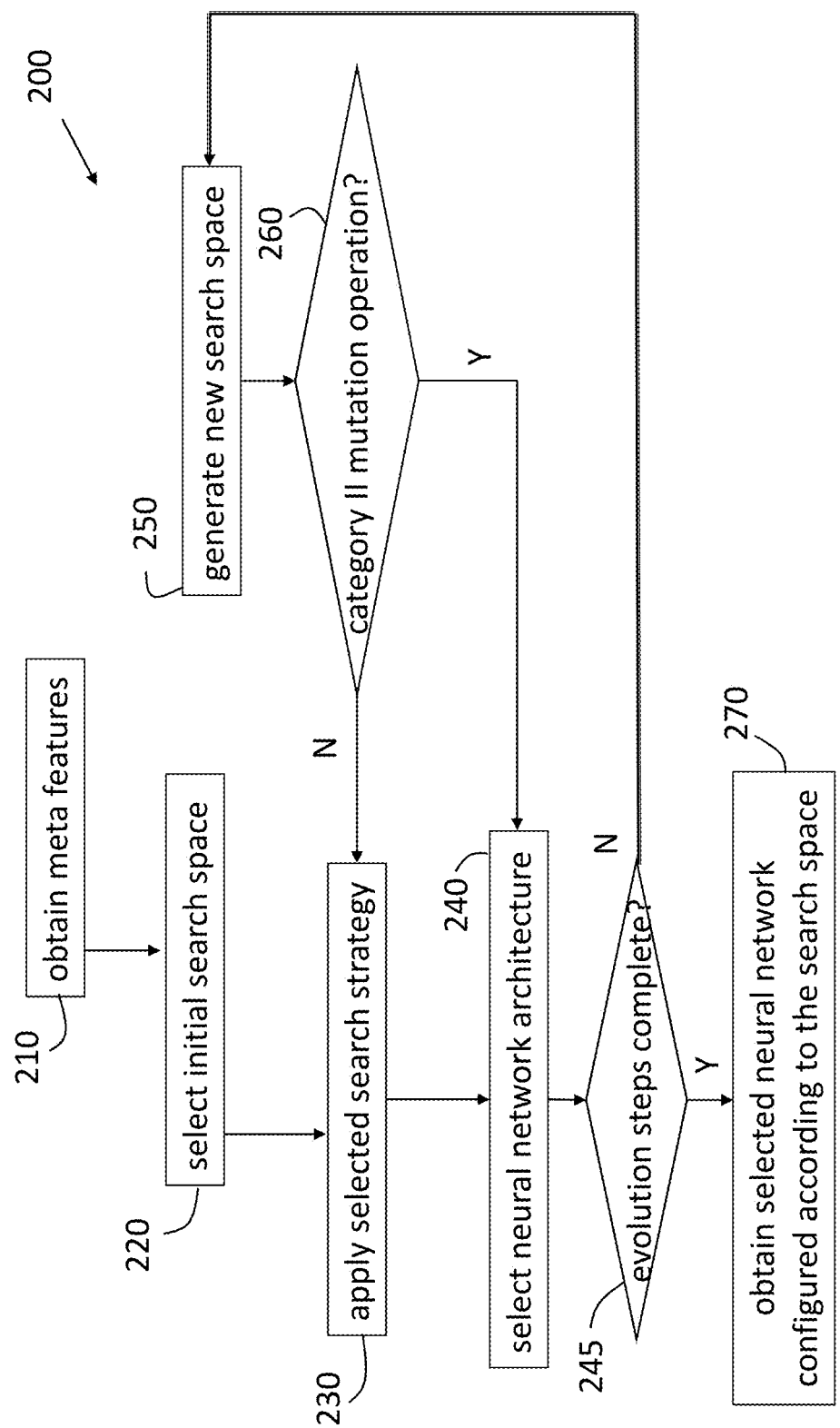
FIG. 2 is a process flow of a method of performing search space exploration for deep learning according to one or more embodiments of the invention.

FIG. 2 is a process flow of a method 200 of performing search space exploration for deep learning according to one or more embodiments of the invention. The process flow of the method 200 can be an implementation of the decision tree 100 discussed with reference to FIG. 1. At block 210, obtaining meta features 110 refers to a known process of obtaining a vector representing a selected database. Selecting an initial search space 120a, at block 220, is based on previous supervised learning. This initial search space 120a defines a type of architecture representation and associated hyperparameter values. At block 230, applying a selected search strategy 130m again refers to following a path of the decision tree 100 according to previous supervised learning to select one of the search strategies 130. The selected search strategy 130m compares the performance of different neural network architectures 140 represented by the architecture representation type that the initial search space 120a specifies. Based on this comparison, selecting a neural network architecture 140x is performed at block 240.

While only the initial search space 120 is sufficient to obtain a neural network architecture 140, a new search space 125 is generated for exploration according to one or more embodiments of the invention. An evolutionary algorithm is used and a mutation operation is performed on the initial search space 120 in order to generate the new search space 125. As previously noted, the evolutionary algorithm may involve multiple evolution steps or iterations of the processes beginning at block 250. Thus, a check is done, at block 245, of whether the evolution steps are complete. After the processes at blocks 230 and 240 are completed with the initial search space 120a, as discussed above, the evolution steps will not have even started. Thus, the processes would proceed to block 250, as indicated in FIG. 2.

Specifically, at block 250, one of the mutation types discussed with reference to FIG. 1 is performed to generate the new search space 125. At block 260, a check is done of whether, the particular mutation type that was randomly selected and performed is a category II mutation type. If not (i.e., if, instead, the generation of the new search space 125 at block 250 was based on a category I mutation type), then the process flow returns to block 230. That is, the same search strategy 130m used with the initial search space 120a is reused and, at block 240, a neural network architecture 140 that exhibited the best performance is selected. As previously noted, this neural network architecture 140 may not necessarily be the neural network architecture 140x selected according to the search strategy 130m based on the initial search space 120a.

If, instead, the check at block 260 indicates that a category II mutation type was used to generate the new search space 125 at block 250, then only the process at block 240 is repeated. That is, the hyperparameters of the new search space 125 are applied to the neural network architecture 140 that was selected, at block 240, based on the initial search space 120a. If the check at block 245 indicates that the evolution steps of the evolutionary algorithm are complete, then, at block 270, the last selected neural network architecture 140 (at block 240) is configured according to the last new search space 125 (according to the processes at block 250) and obtained for use.

Figure 3:
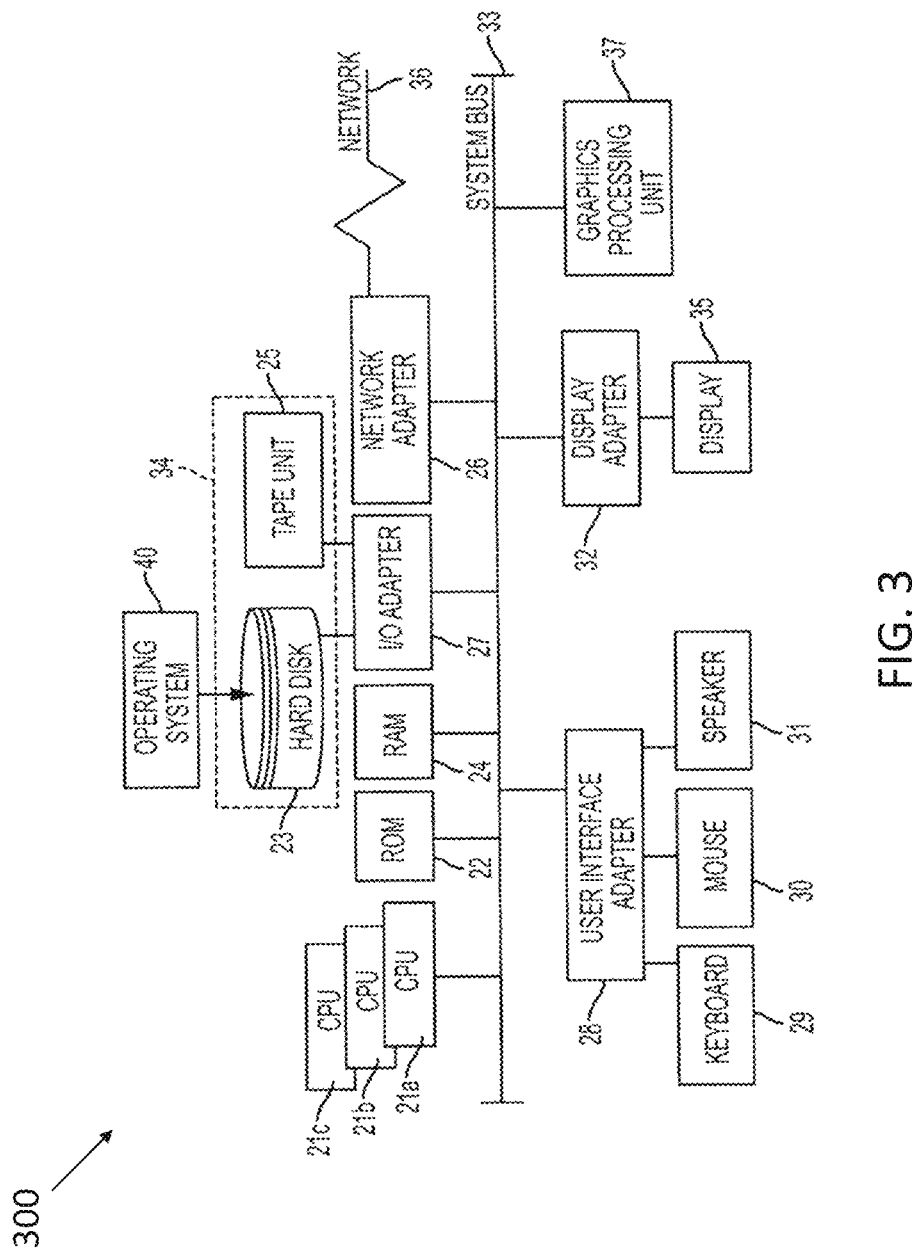
FIG. 3 is a block diagram of a processing system for implementing the search space exploration according to one or more embodiments of the invention.

It is understood that one or more embodiments of the present invention are capable of being implemented in conjunction with any other type of computing environment now known or later developed. For example, FIG. 3 depicts a block diagram of a processing system 300 for implementing the techniques described herein (e.g., processes of the method 200). In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   A computer-implemented method comprising:
   obtaining, using a processor, meta features corresponding with a dataset configured to be used for training in a deep learning application;

selecting, using the processor, an initial search space, wherein the initial search space defines a type of deep learning architecture representation to represent two or more neural network architectures and specifies hyperparameters for the two or more neural network architectures;

applying, using the processor, a search strategy to the initial search space, wherein the search strategy performs an evaluation of each of the two or more neural network architectures represented according to the initial search space;

selecting, using the processor, one of the two or more neural network architectures based on a result of the evaluation according to the search strategy;

generating, using the processor, a new search space with new hyperparameters that differ from the hyperparameters specified by the initial search space using an evolutionary algorithm and a mutation type selected from a plurality of mutation types, wherein each mutation type defines one or more changes in the hyperparameters specified by the initial search space, each mutation type is part of a first category or a second category, the generating is performed iteratively for each selected mutation type, and the generating includes, for each iteration:

randomly selecting the mutation type, performing a check to determine whether the selected mutation type is part of the first category or the second category, based on the selected mutation type being part of the first category, applying the search strategy to the new search space to re-select a neural network architecture, and based on the selected mutation type being part of the second category, applying the new hyperparameters to the one of the two or more neural networks to re-select the neural network architecture;

based on a result of applying the search strategy or the new hyperparameters having a sufficient accuracy, acquiring a color image dataset and training the re-selected neural network architecture using the color image dataset;

based on the result having an insufficient accuracy, repeating the iteration until the re-selected neural network architecture has at least the sufficient accuracy, and training the re-selected neural network architecture using the dataset; and inputting color image data related to an application of interest to the trained re-selected neural network architecture, and performing at least one of feature extraction and classification by the trained re-selected neural network architecture.

2. The computer-implemented method according to claim 1, wherein the selecting the initial search space is based on a supervised learning process.

3. The computer-implemented method according to claim 1 further comprising selecting the search strategy based on a supervised learning process.

4. The computer-implemented method according to claim 1, wherein the applying the search strategy to the new search space is based on the mutation type being a change in at least one of a set of operations that include separable convolution, average pooling, max pooling, skip connect, and dilated convolution.

5. The computer-implemented method according to claim 1, wherein the applying the new hyperparameters to the one of the two or more neural networks is based on the mutation type being a change in a number of layers of the one of the two or more neural network architectures.

6. The computer-implemented method according to claim 1, wherein the applying the new hyperparameters to the one of the two or more neural networks is based on the mutation type being a change in a minimal number of channels of a convolutional operation in the one of the two or more neural networks.

7. The computer-implemented method according to claim 1, wherein the applying the new hyperparameters to the one of the two or more neural networks is based on the mutation type being a change in a skip pattern that defines connections between operations in a chain when the deep learning architecture representation is a chain-structure representation.

8. The computer-implemented method according to claim 1, wherein the applying the new hyperparameters to the one of the two or more neural networks is based on the mutation type being a change in a number of input connections to a node when the deep learning architecture representation is a cell structure representation.

9. A system comprising: a memory having computer readable instructions; and one or more processors for executing the computer readable instructions, the computer readable instructions controlling the one or more processors to perform operations comprising:

obtaining meta features corresponding with a dataset configured to be used for training in a deep learning application;

selecting an initial search space, wherein the initial search space defines a type of deep learning architecture representation to represent two or more neural network architectures and specifies hyperparameters for the two or more neural network architectures;

applying a search strategy to the initial search space, wherein the search strategy performs an evaluation of each of the two or more neural network architectures represented according to the initial search space;

selecting one of the two or more neural network architectures based on a result of the evaluation according to the search strategy;

generating a new search space with new hyperparameters that differ from the hyperparameters specified by the initial search space using an evolutionary algorithm and a mutation type selected from a plurality of mutation types, wherein each mutation type defines one or more changes in the hyperparameters specified by the initial search space, each mutation type is part of a first category or a second category, the generating is performed iteratively for each selected mutation type, and the generating includes, for each iteration:

randomly selecting the mutation type, performing a check to determine whether the selected mutation type is part of the first category or the second category, based on the selected mutation type being part of the first category, applying the search strategy to the new search space to re-select a neural network architecture, and based on the selected mutation type being part of the second category, applying the new hyperparameters to the one of the two or more neural networks to re-select the neural network architecture;

based on a result of applying the search strategy or the new hyperparameters having a sufficient accuracy, acquiring a color image dataset and training the re-selected neural network architecture using the color image dataset;

based on the result having an insufficient accuracy, repeating the iteration until the re-selected neural network architecture has at least the sufficient accuracy, and training the re-selected neural network architecture using the dataset; and inputting color image data related to an application of interest to the trained re-selected neural network architecture, and performing at least one of feature extraction and classification by the trained re-selected neural network architecture.

10. The system according to claim 9, wherein the one or more processors are configured to select the initial search space is based on a supervised learning process.

11. The system according to claim 9 further comprising the one or more processors selecting the search strategy based on a supervised learning process.

12. The system according to claim 9, wherein the one or more processors are configured to apply the search strategy to the new search space based on the mutation type being a change in at least one of a set of operations that include separable convolution, average pooling, max pooling, skip connect, and dilated convolution.

13. The system according to claim 9, wherein the one or more processors are configured to apply the new hyperparameters to the one of the two or more neural networks based on the mutation type being a change in a number of layers of the one of the two or more neural network architectures.

14. The system according to claim 9, wherein the one or more processors are configured to apply the new hyperparameters to the one of the two or more neural networks based on the mutation type being a change in a minimal number of channels of a convolutional operation in the one of the two or more neural networks.

15. The system according to claim 9, wherein the one or more processors are configured to apply the new hyperparameters to the one of the two or more neural networks based on the mutation type being a change in a skip pattern that defines connections between operations in a chain when the deep learning architecture representation is a chain-structure representation.

16. The system according to claim 9, wherein the one or more processors are configured to apply the new hyperparameters to the one of the two or more neural networks based on the mutation type being a change in a number of input connections to a node when the deep learning architecture representation is a cell structure representation.

17. A computer program product comprising a computer readable storage medium having program instructions embodied therewith, the program instructions executable by a processor to cause the processor to perform operations comprising:

obtaining, using a processor, meta features corresponding with a dataset configured to be used for training in a deep learning application;

selecting, using the processor, an initial search space, wherein the initial search space defines a type of deep learning architecture representation to represent two or more neural network architectures and specifies hyperparameters for the two or more neural network architectures;

applying, using the processor, a search strategy to the initial search space, wherein the search strategy performs an evaluation of each of the two or more neural network architectures represented according to the initial search space;

selecting, using the processor, one of the two or more neural network architectures based on a result of the evaluation according to the search strategy;

generating, using the processor, a new search space with new hyperparameters that differ from the hyperparameters specified by the initial search space using an evolutionary algorithm and a mutation type selected from a plurality of mutation types, wherein each mutation type defines one or more changes in the hyperparameters specified by the initial search space, each mutation type is part of a first category or a second category, the generating is performed iteratively for each selected mutation type, and the generating includes, for each iteration:

randomly selecting the mutation type, performing a check to determine whether the selected mutation type is part of the first category or the second category, based on the selected mutation type being part of the first category, applying the search strategy to the new search space to re-select a neural network architecture, and based on the selected mutation type being part of the second category, applying the new hyperparameters to the one of the two or more neural networks to re-select the neural network architecture;

based on a result of applying the search strategy or the new hyperparameters having a sufficient accuracy, acquiring a color image dataset and training the re-selected neural network architecture using the color image dataset;

based on the result having an insufficient accuracy, repeating the iteration until the re-selected neural network architecture has at least the sufficient accuracy, and training the re-selected neural network architecture using the dataset; and inputting color image data related to an application of interest to the trained re-selected neural network architecture, and performing at least one of feature extraction and classification by the trained re-selected neural network architecture.

18. The computer program product according to claim 17, wherein the selecting the initial search space is based on a supervised learning process, and performing the operations further comprises selecting the search strategy based on a supervised learning process.

19. The computer program product according to claim 17, wherein the applying the search strategy to the new search space is based on the mutation type being a change in at least one of a set of operations that include separable convolution, average pooling, max pooling, skip connect, and dilated convolution.

20. The computer program product according to claim 17, wherein the applying the new hyperparameters to the one of the two or more neural networks is based on the mutation type being a change in a number of layers of the one of the two or more neural network architectures, a change in a minimal number of channels of a convolutional operation in the one of the two or more neural networks, a change in a skip pattern that defines connections between operations in a chain when the deep learning architecture representation is a chain-structure representation, or a change in a number of input connections to a node when the deep learning architecture representation is a cell structure representation.

* * * * *